United States Patent Office 2,757,738
Patented Aug. 7, 1956

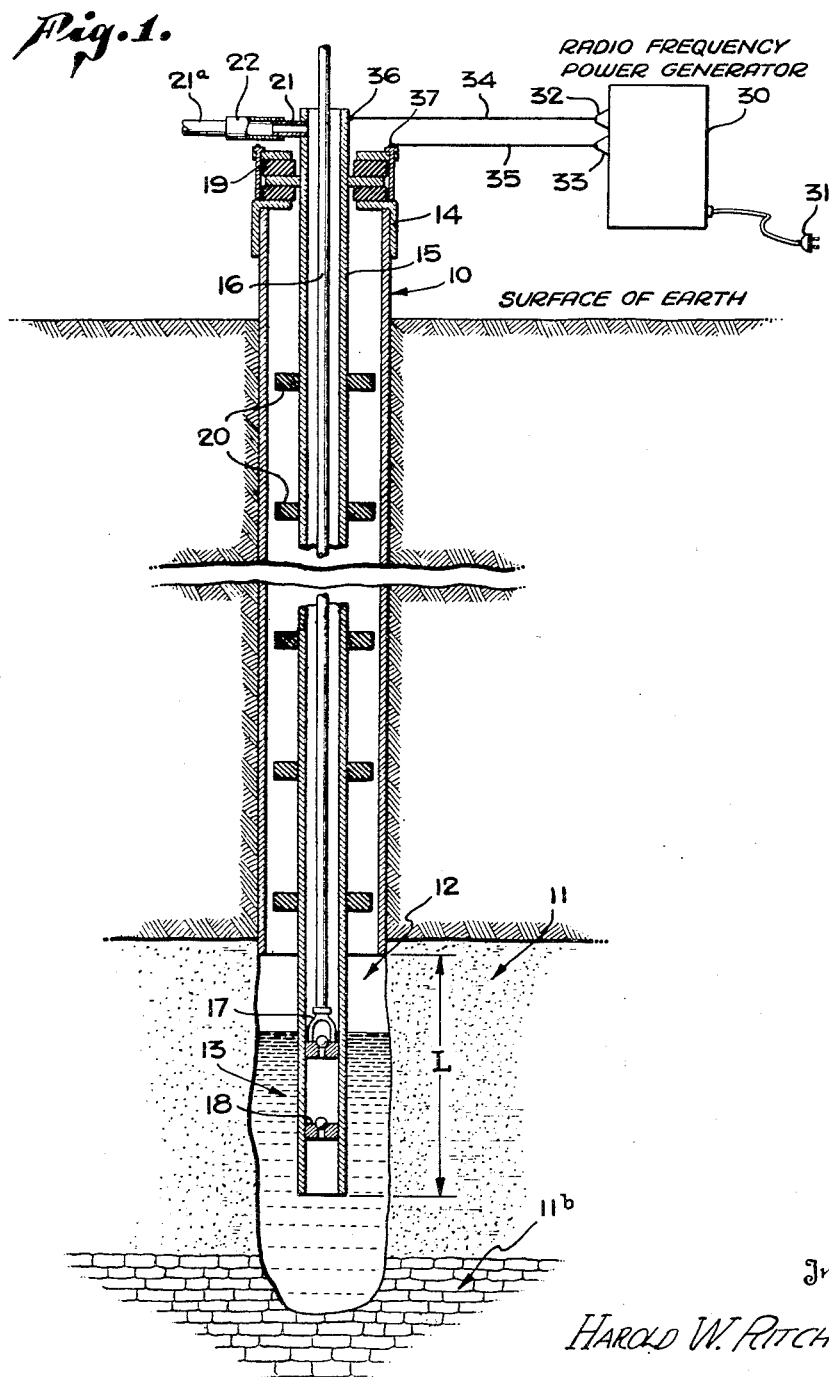

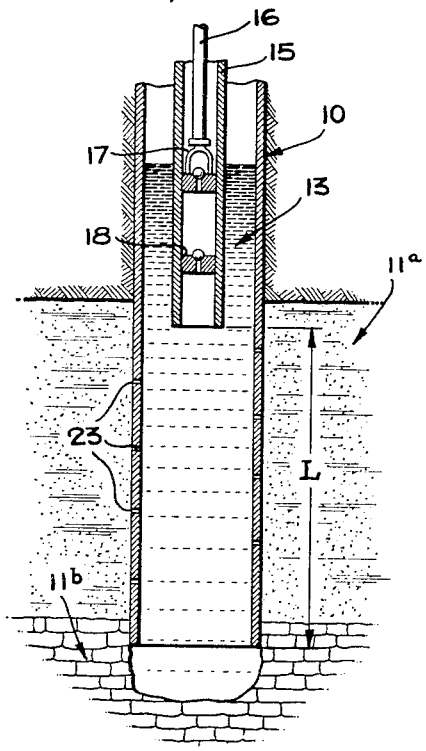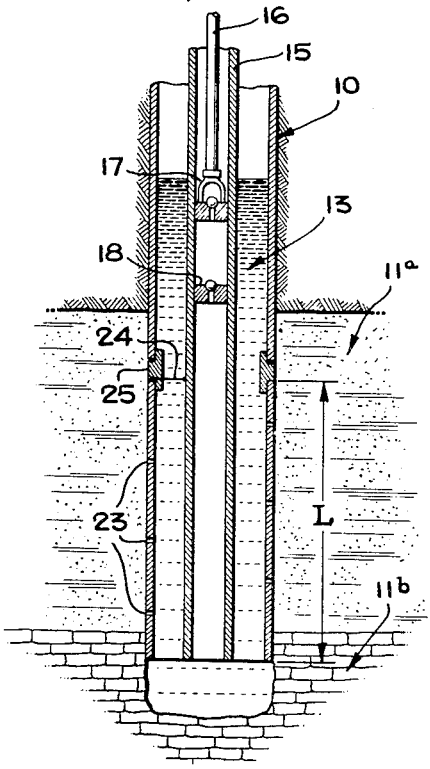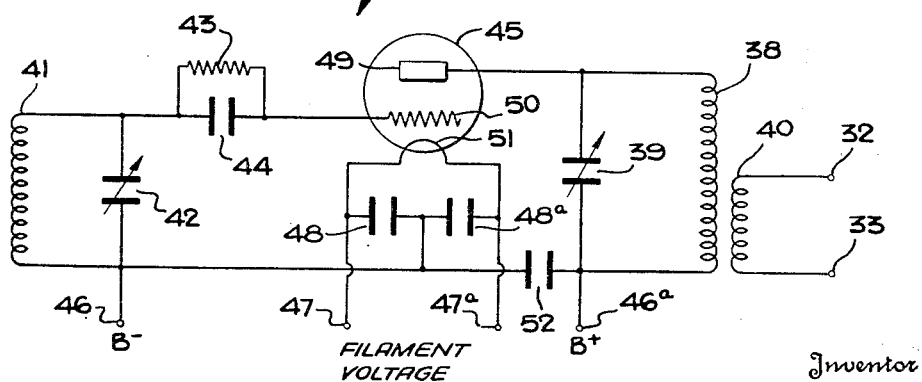

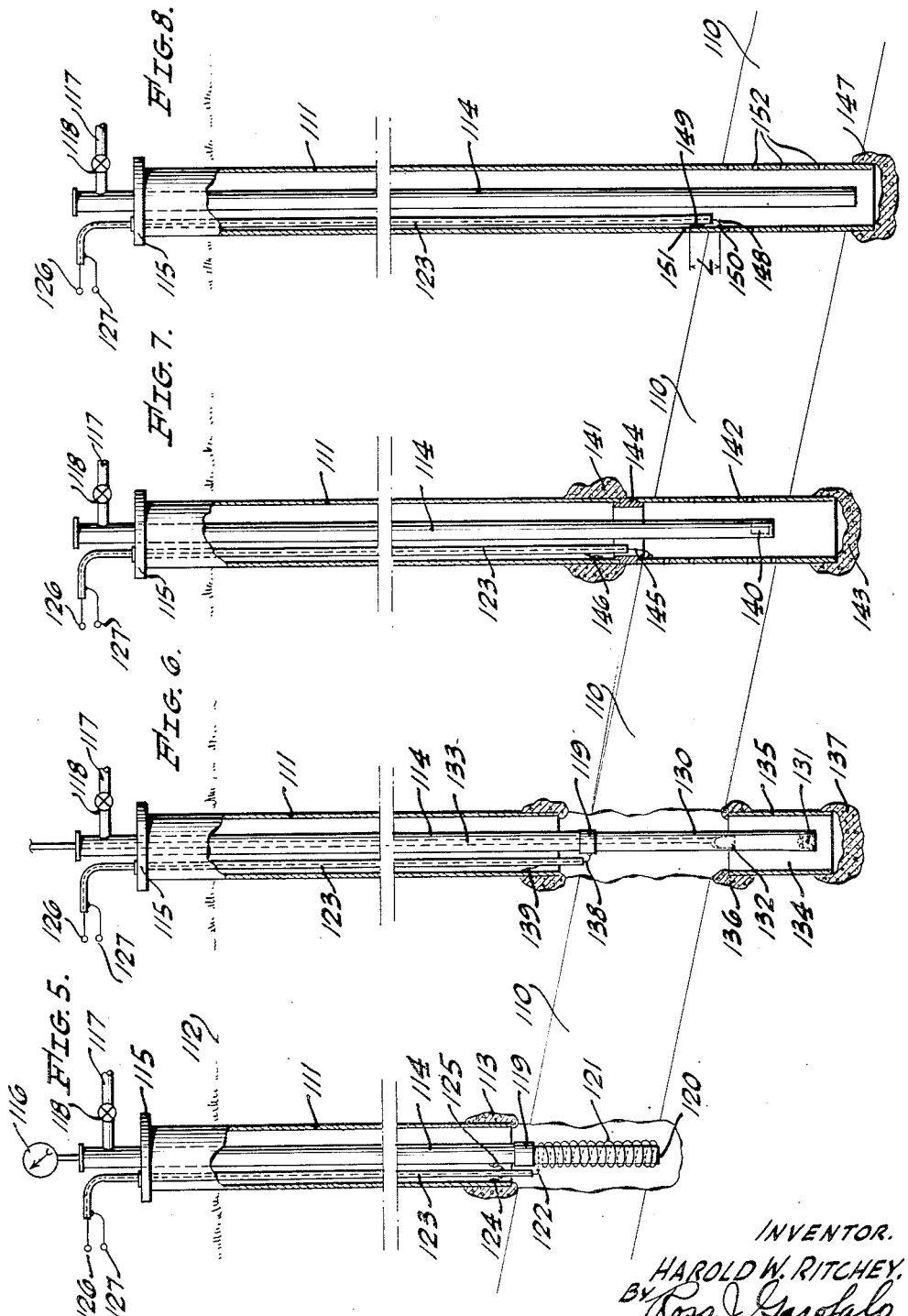

2,757,738

RADIATION HEATING

Harold W. Ritchey, Richland, Wash., assignor to Union Oil Company of California, Los Angeles, Calif., a corporation of California Application September 20, 1948, Serial No. 50,152

34 Claims. (Cl. 166—39)

This invention relates to a method and apparatus for heating which involves the radiation and absorption of electromagnetic energy having frequencies in the radiofrequency range. More particularly this invention relates to an apparatus which is particularly well adapted to heating subsurface oil- or gas-bearing strata or other subsurface permeable strata from which valuable products may be recovered at an increased rate through the application of heat.

This application is a continuation-in-part of copending application, Serial No. 720,424, filed January 6, 1947, now forfeited.

In newly completed oil or gas wells, for example, the fluid pressure within the productive formation is sufficiently high to force that fluid upwardly through a well bore penetrating the formation and out at the surface. These are known as "pressure" or "flowing" wells and the rate of production is controlled by a valve at the surface or by what is known as a "choke" near the bottom of the well. In old wells, and in wells completed into relatively low pressure formations, there is insufficient pressure to force the fluids to the surface and pumps must be inserted to effect their recovery.

Such valuable fluids are very often found in permeable strata penetrated by a borehole. These fluids flow through the permeable formation at a rate which is determined by the permeability of the permeable formation, the distance over which the fluid must flow, and the differential pressures between the source and sink, the latter being the reservoir at the bottom of the bore. The permeability is a measurement of the resistance to fluid flow and is given by the permeability factor K in the following relationship:

$$\frac{dQ}{dt} = \frac{KAdP}{\mu dL}$$

wherein K is the permeability of the formation, A is the average cross sectional area of the permeable formation exposed to fluid flow, $\mu$ is the fluid viscosity, and $dP$ is the pressure differential causing the fluid to flow through the distance $dL$ at a rate of $dQ/dt$.

From the equation given above it is obvious that a decrease in viscosity, other things remaining equal, will give an increase in fluid flow rate which would be highly desirable since the productivity of a well is usually directly dependent upon the resistance offered by the permeable formation to fluid flow. In a great majority of cases, and this is particularly true in the case of wells drilled for the production of gas and crude oil, an appreciable viscosity decrease is readily effected by an increase in temperature. It is to this end, therefore, that the present invention is directed, namely to the increasing of well productivity by the application of heat to the productive formation.

Numerous methods for subsurface heating have been previously attempted or proposed such as the circulation of heated fluids through the well, the generation of heat by chemical means, by oxidation of gas or oil, or the like, or by the suspension of electrical heaters in the well opposite the formation to be heated. The passage of electric current through the formation by using electrodes in a multiplicity of adjacent wells has been attempted, but none of these have the inherent advantages or have been as successful as the method and apparatus of this invention.

The principal disadvantage in the circulation of heated fluids through oil wells is the fact that a large fraction of the heat conducted downward into the well with the heated fluid is lost by interchange with the cooled fluid rising from the well with the result that only a small amount of the heat is actually applied directly to the desired area. Furthermore, such fluid circulation methods of heating are generally difficult to apply when the well is being produced, i. e., when crude petroleum is being removed from the oil-bearing strata. Heating methods which consist of direct oil or gas firing produce large amounts of heat in the region where heat is desired, but in most cases develop temperatures which are sufficiently high to cause pyrolysis or decomposition of the crude petroleum together with the evaporation of water. This practice causes the contamination of the natural gas normally produced with crude petroleum rendering it commercially unusable. The pyrolysis tends to deposit carbon and the evaporation of the water deposits salts in the oil-bearing strata, both deposits tending to restrict the crude petroleum flow. Chemical means of heat generation are generally unsatisfactory, since the amount of heat generated is not particularly large and the method sometimes involves the handling of corrosive materials. Oil well heating through the suspension of electrical resistances in the well bore have been used with limited success but because of the relatively small area of such heaters the rate of heat transfer to the oil-bearing strata is not high unless the heater is operated at elevated temperatures. High temperature operation is apt to cause pyrolysis and water evaporation with the attendant disadvantages previously mentioned. The passage of electric currents through oil-bearing strata in the presence of water containing dissolved salts leads to problems involving electrolysis and corrosion of the metal parts of the well casing and pump tubing. Practically all of the heating methods previously proposed have additional disadvantages in that they require the introduction into the well bore of extraneous equipment which is usually bulky, delicate in nature, and difficult and laborious in installation. Most of the previous methods involve the transfer of heat from the well bore into the oil-bearing strata by means of thermal conduction. If crude petroleum is being produced simultaneously with the heating operation, the heat penetrating from the well bore and conducted into the oil-bearing strata is seriously reduced by the crude petroleum flowing in the opposite direction unless high temperature gradients are employed. High temperatures necessarily accompany high temperature gradients in such an installation, and these are objectionable due to pyrolysis and salt deposition, as explained in foregoing paragraphs.

The present invention involves the radiation of electromagnetic energy at radio-frequencies from a radiating section or antenna positioned in the well bore at a level with or in between the upper and lower levels of an oil-bearing strata. A portion of the radiated electromagnetic energy penetrates a considerable distance into the oil-bearing strata before being absorbed or dissipated and converted thereby into thermal energy or heat. Thus, heat is actually generated within the oil-bearing strata at a distance from the radiating section.

It is therefore an object of my invention to provide a method and apparatus for transferring energy for heating purposes without the necessity of a temperature gradient.

A further object of this invention is to increase the production rate of valuable fluids from wells through the generation of heat within the producing formation brought about by the absorption of radiated electromagnetic energy.

A more specific object of this invention is to provide a method and apparatus for increasing the rate of production of crude petroleum from an oil well at any stage in the life of the oil well before the rate of production by conventional flowing and pumping means becomes uneconomical.

A further object of this invention is to make available for recovery a substantial amount of the crude petroleum which remains in oil-bearing strata after recovery operations by conventional methods have ceased to show a profit.

A more particular object of this invention is to provide a method and apparatus for the introduction of energy for heating purposes, without the necessity of temperature gradients, into the producing horizon of an oil well to cause an increase in the temperature of the oil-bearing strata and thereby reduce the viscosity of the crude petroleum contained in the formation.

A more specific object of this invention is to provide an apparatus which comprises an electromagnetic energy generator, a transmission line, and a metallic radiator wherein the radiator is positioned adjacent to the formation to be heated.

An additional object of this invention is to provide improved subsurface radiating members from which electro-magnetic energy may be efficiently radiated to increase the rate of crude petroleum production by decreasing the fluid viscosity and melting deposits which may plug the bores of the formation or by increasing the formation pressure by the expulsion of hydrocarbon gases from solution.

Another object of this invention is to provide improved radiating members which are readily constructed and positioned within a well bore penetrating a productive formation.

Other objects, features, and advantages of this invention will become apparent to those skilled in the art as the description and illustration thereof proceeds.

Briefly, the process of the present invention comprises the radiation of electromagnetic energy in the radio-frequency range above 15,000 cycles per second from a radiating section or member employed as an antenna or radiator and situated within the well bore opposite and adjacent to the productive formation to be heated. This radiating section is electrically connected by a suitable transmission line to an electromagnetic energy generator. The electromagnetic energy generated is conducted via the transmission line down through the well bore to the radiating section and from which the energy is radiated into the permeable or productive strata it is desired to heat. The radiated electromagnetic energy is converted into thermal energy which is manifest as heat in the subsurface solid and liquid or heterogeneous solid and liquid formation in proximity to the radiator. Permeable formations are thus heated without the formation of the required excessive temperature differentials which heretofore have rendered certain types of subsurface heating impractical.

This invention further relates to the positioning of a radiating section or antenna within the bore of an oil well substantially on an equal level with the oil-bearing strata and radiating electromagnetic energy so that it penetrates the formation and is therein absorbed and dissipated with the simultaneous conversion of the radiated energy into thermal energy or heat.

Specifically this invention resides in the positioning of improved radiating sections or antennas within the bore of an oil well substantially on an equal level with the oil-bearing strata and radiating electromagnetic energy therefrom to penetrate the subsurface formations. The radiated energy is therein absorbed and dissipated with the simultaneous conversion of the radiated energy into thermal energy or heat.

It is to be understood the term "radiated energy" as used herein may differ somewhat in meaning from the meaning implied when the term is used in the art of radio communication. This term is intended to include all the electromagnetic energy which leaves the antenna and is not returned to the antenna during any later portion of a cycle.

The radiation of electromagnetic energy from a conductor or radiator through which alternating currents pass is a phenomenon which becomes appreciable when the frequency of current alternation increases above 3000 cycles per second. Below this frequency electromagnetic fields generated around the conductor absorb energy from the conductor on one part of the cycle and return it to the conductor in a subsequent part of the cycle. The electromagnetic energy thus stored is in the form of magnetic and electrostatic fields surrounding the conductor. When the frequency of current alternation exceeds about 3000 cycles per second, an appreciable portion of the electromagnetic energy thus stored in the field fails to return and is radiated from the conductor through space at the speed of light. The distance which this radiated energy may travel is a complex function of the alternating current frequency, its intensity, and the physical and electromagnetic properties of the medium through which the radiated energy passes. The propagation velocity of the radiated electromagnetic energy through solid and liquid media having a dielectric constant higher than unity is somewhat less than the velocity through air and often the energy is more quickly absorbed and dissipated, i. e., the radiated electromagnetic energy penetrates into the medium surrounding the radiating section a much shorter distance before being converted into thermal energy or heat.

The radiated electromagnetic energy is in the form of an electromagnetic field having a magnetic component and an electric component existing together and each component containing an equal amount of energy. These individual components react in different manners with the various parts of heterogeneous oil-bearing strata and the electromagnetic energy contained in these two fields is absorbed in the oil-bearing strata through electrical losses by the combined mechanisms of eddy current generation, magnetic hysteresis, and dielectric hysteresis which will be familiar to those skilled in the art. These energy losses, equivalent to the amount of electromagnetic energy absorbed in the formation, generate thermal energy at various separated points away from the well bore which causes the temperature of the oil-bearing strata in which the electromagnetic energy is absorbed to increase.

This absorption and dissipation of electromagnetic energy in solid and liquid media having the property of being "opaque" to the radiated energy may be likened to the absorption of light by certain solutions or semitransparent solids in that a given thickness of the absorbing medium will absorb and dissipate and thereby convert into thermal energy a given fraction of the incident energy. For example, the first layer having a thickness of one foot may absorb 50% of the radiated energy, the succeeding layer also having a thickness of one foot may absorb 50% of the energy penetrating through the first layer amounting to 25% of the radiated energy, etc., in accordance with a familiar principle of physics known as Lambert's law.

The radio-frequency electromagnetic energy, similar to that utilized in radio transmitting stations, may be conveniently generated in equipment comprising a vacuum tube oscillator followed by vacuum tube amplifiers which serve to increase the available amount of energy at the radio-frequency. This energy is radiated into space from a radiating section or antenna having particular dimensions and is conducted from the generation equipment to the radiating section by a transmission line designed to reduce radiation losses to a minimum. This may be a twisted pair of conductors, a coaxial line, an open parallel wire line, wave guide, or other suitable transmission line. Each type of transmission line has a particular characteristic impedance and the radiator attached thereto should be constructed to match this impedance for efficient energy transfer. Impedance matching networks may be employed to match nearly any transmission line to any radiator. The radiating section or antenna connected to the end of the transmission line must be of certain physical size and dimensions in order to effectively radiate the desired amount of energy, this dimension ordinarily being approximately any integral multiple of one-quarter wavelength in order to effectively match the characteristics of the line. The wavelength of the radiated electromagnetic energy depends upon the frequency and is related to the velocity of light according to the following equation:

$$\lambda = \frac{c}{f}$$

in which $\lambda$ is the wavelength in meters, $f$ is the frequency in kilocycles per second and $c$ is the velocity of light which is approximately 300,000 kilometers per second in a vacuum. Thus, for a frequency of 10,000 kilocycles (10,000,000 cycles per second), the wavelength would be 30 meters or 98.5 feet in a vacuum. A one-quarter wavelength radiating section would be therefore about 24.6 feet long in air, which has approximately the same transmission properties as a vacuum. However, a radiating section having a length which is any integral multiple of 24.6 feet may be used.

Radiators positioned in the subsurface, however, will resonate at frequencies different from those in air because of differences in dielectric constant of the medium through which radiation occurs. The electrical length of the radiator is substantially equal to the physical length in air or a vacuum. However, the electrical length increases when the medium surrounding the radiator has a dielectric constant greater than that of air. It also changes somewhat with the size of the borehole. The electrical length increases approximately in proportion to the square root of the dielectric constant D according to the following relation:

$$\lambda \sim \frac{c\sqrt{D}}{f}$$

where the characters have the significance given above. The increase in electrical length lowers the resonant frequency of the radiator from the frequency in air or a vacuum. In some applications, low frequency energy is desirable to penetrate back farther into the formation to be heated.

In the application of radiated electromagnetic energy to oil well heating, the pump tubing and the well casing may be positioned in a concentric relationship and insulated from one another to form a coaxial transmission line by means of which electromagnetic energy in the radio-frequency range generated at the surface may be conducted to a radiating section positioned within the well bore adjacent to the oil-bearing strata. The radiating section may conveniently comprise an extension of the pump tubing below the lower end of the casing a distance which is equivalent to an integral multiple of one-quarter wavelength, or the extension of the casing below the lower end of the pump tubing an equivalent distance. As is clearly shown by the equation given directly above, the wavelength and correspondingly the length of a radiating section corresponding to one-quarter wavelength, is quite long for electromagnetic energy radiation at the lower frequencies and also quite short for the higher radio-frequencies. Although the method of my invention is applicable for heating over wide ranges of radio-frequency such as from an extremely low frequency of about 50 kilocycles to an extremely high frequency of about 5000 megacycles, the preferred range of frequencies for the application of heating of oil-bearing strata in present installations is between about 500 and about 250,000 kilocycles. The use of radiated electromagnetic energy at frequencies above about 100,000 kilocycles may permit the modification of the radiating section positioned in the well bore in such a manner as to allow the control of the direction which the radiated energy penetrates from the radiating section.

The accompanying drawings show schematic cross sections of typical well bores showing the casing and tubing and allied equipment adapted to permit underground electromagnetic heating of the producing formation. In these drawings are shown various modifications of the improved radiation heating apparatus to which this invention is directed.

A clearer understanding of the methods of the improved radiation apparatus of this invention may be had by reference to the drawings in which:

Figure 1 represents a vertical cross section of a typical oil well known to those skilled in the art as a "barefoot" completion into an oil-bearing strata which possesses sufficient mechanical strength to resist caving and which is suitably arranged to permit electromagnetic heating by the method of the present invention.

Figure 2 and Figure 3 represent vertical cross sections of the lower portion of an oil well completed into an oil-bearing strata which possesses an insufficient resistance to caving, the upper portion of the well being the same as that shown in Figure 1.

Figure 4 represents a schematic wiring diagram for a self-excited oscillator which is one modification of suitable apparatus generating radio-frequency electromagnetic energy.

Figure 5 shows a radiating apparatus which comprises a coil positioned on the tubing and opposite to the formation to be heated and which resonates at a lower frequency than obtainable using an uncoiled radiator.

Figure 6 shows a type of radiator which comprises a portion of the pump tubing extending through the formation to be heated and which is insulated from the main pump tubing.

Figure 7 shows a modification of the apparatus in which a lower portion of the well casing which is insulated from the main or upper portion of the pump casing is used as the radiator, and Figure 8 shows the utilization of the lower portion of the casing without insulation from the upper portion as the radiator.

Referring more particularly to Figure 1, the metal well casing 10 is shown extended from the surface of the earth down and into oil-bearing strata 11 which possesses sufficient mechanical strength to resist caving and in which the bore of the well has been continued through oil-bearing strata 11 into the adjacent non-oil-bearing strata 11b immediately below. Metal well casing 10 extends only a short distance into oil-bearing strata 11 and pump tubing 15 is equipped at the lower end with check valve which seeps the crude petroleum from strata 11. Pump tubing 15 is equipped at the lower end with check valve 18 which permits flow of crude petroleum from pocket 13 into pump tubing 15, but prevents reverse flow. Such flow of crude petroleum is maintained by the reciprocal motion of pump 17 which is connected by means of sucker rod 16 extending upward to the surface through pump tubing 15 to suitable motive means, not shown, located at the surface. Pump tubing 15 is maintained in concentric relationship with casing 10 throughout the entire distance from the surface of the earth to strata 11 by means of a series of pump tubing insulators 20 which may be of any synthetic or ceramic material or the like having a low dielectric loss at the frequency employed. Casing 10 is equipped at the surface with a special casinghead 14 which permits the electrical insulation of pump tubing 15 from casing 10. Pump tubing 15 is equipped with oil line 21 located above casinghead 14 by which crude petroleum pumped from strata 11 is removed. A length of insulating tubing 22 which prevents the electrical short circuiting of pump tubing 15 and casing 10 is disposed between the oil line 21 from pump tubing 15 and oil line 21a. It is convenient to use a two-foot length of neoprene or the like for this purpose. The sucker rod is insulated from motive means not shown by bolting plates of suitable insulation in between steel face plate to which are attached the upper and lower sections of sucker rod 16.

A radio-frequency power generator 30 is connected to pump tubing 15 and casing 10 at points 36 and 37 by means of electrical conductors 34 and 35 and the generator output terminals 32 and 33, respectively. Care is necessary in insulation of oil line 21a, casinghead 14, and sucker rod 16 in order to confine the electromagnetic energy to those portions of the equipment involved in its transmission. Electrical conductors 34 and 35 serve as a transmission line for the transfer of electromagnetic energy without radiation loss from generator 30 to the electrical connections 36 and 37 at the casinghead. These conductors may be positioned parallel to each other and separated by a distance of from 2 to 20 inches depending upon the desired impedance of the transmission line required for most efficient energy transfer. One of the two conductors 34 and 35 may consist of a tube and the other of a wire and the transmission line formed by disposing the wire concentrically within and insulated from the tube to form a coaxial transmission line. The two conductors may also consist of two insulated wires twisted together to form a twisted pair transmission line. Other suitable means for conducting radio-frequency electromagnetic energy without radiation loss such as wave guides, etc., may be provided as may be apparent to those skilled in the art. The selection of the transmission line for a given installation is made after consideration of the frequency of the energy being transferred, the desired impedance of the transmission line, and the distance between the generator and the casinghead.

The concentric combination of pump tubing 15 and casing 10 forms a coaxial transmission line which is an efficient method for conducting radio-frequency electromagnetic energy. Loss of radio-frequency energy from a coaxial transmission line is extremely low because the electromagnetic field which tends to be generated by current flow in pump tubing 15 is very efficiently cancelled by the electromagnetic field of opposite polarity generated by current flow in the opposite direction in casing 10. In addition, losses due to electrical resistance of the coaxial line are unusually low because of the large cross sectional area of the metal in pump tubing 15 and casing 10.

Because of the fact that pump tubing 15 extends downward beyond the lower end of casing 10 a distance L, the flow of radio-frequency current in that section of pump tubing 15 generates a radio-frequency electromagnetic field which is not counteracted by an electromagnetic field of opposite polarity and consequently that section of pump tubing 15 radiates electromagnetic energy into oil-bearing strata 11. In order to obtain an efficient transfer of radio-frequency energy from generator 30 to strata 11, the distance L which pump tubing 15 extends downward beyond the lower end of casing 10 must be approximately equal to a distance which is an integral number of one-quarter of the wavelength corresponding to the frequency of the energy generated in generator 30. For example, this distance is about 35 feet for a frequency of 6,700 kilocycles. The frequency of the electromagnetic energy generated may be varied somewhat, however, from the frequency having a one-quarter wavelength approximately equal to the distance L because of the electromagnetic energy absorption characteristics of the ambient oil-bearing strata 11. The proper frequency to be used may readily be determined during operation by a skilled operator through variation of the frequency of the electromagnetic energy generated by generator 30 until the desired match of impedance between the radiating section and the transmission line is obtained. Under such conditions the maximum per cent of energy is radiated from the lower length L of pump tubing 15 into oil-bearing strata 11. The amount of energy generated by generator 30 is then adjusted to the desired value by varying the coupling between the generator and the transmission line and/or by varying the voltage applied to the generator. The power used will vary with each installation, but generally a value of from as low as five kilowatts to as high as 100 kilowatts or higher may be used. From 10 to 20 kilowatts of power is probably most convenient for the average well.

Radio-frequency energy is radiated from the radiating section i. e., the lower length L of pump tubing 15, into oil-bearing strata 11 and a portion of such energy penetrates into the formation for a considerable distance before being absorbed. The absorption of the thus radiated radio-frequency energy in strata 11 results in the dissipation of the radiated energy with the simultaneous conversion of the dissipated energy into heat, resulting in a temperature increase of strata 11 in the adjacent vicinity. Temperature increase of from 20° to 30° to well over 100° F. may be effected in this manner by allowing energy to radiate over a period of time.

Referring particularly to Figure 2, the lower portion of an oil well is shown which has been completed into an oil-bearing strata 11a which has insufficient mechanical strength to resist caving and consequently casing 10 has been extended completely through strata 11a and into non-oil-bearing strata 11b which is immediately below. Casing 10 has been provided with a series of perforations 23 to permit the flow of crude petroleum into pocket 13. Pump tubing 15 has been extended downward to within a distance L from the bottom of casing 10 and into the body of crude petroleum contained in pocket 13. Electromagnetic energy from the radio-frequency power generator is conducted to the upper portion of the oil well and conducted downward by means of the concentric combination of casing 10 and pump tubing 15. The upper portion of the oil well is identical with that shown in Figure 1. The radiating section in this case consists of the lower portion of casing 10 which extends downward a distance L beyond the lower end of pump tubing 15. Electromagnetic energy is thus radiated from the lower portion L of casing 10 into oil-bearing strata 11a and is subsequently absorbed and dissipated in that strata and converted into heat.

In Figure 3 a modification of the positioning of casing 10 and pump tubing 15 to extend to a common level in the oil-bearing strata 11a is shown. Here, casing insulation 25 is included in casing 10 a distance L from the lower end of casing 10 which electrically separates the lower length L from the rest of the casing and forms the radiating section. A direct electrical connection 24 is made from the upper end of the radiating section to a point directly opposite on pump tubing 15. This connection is made at a voltage node, i. e., from a point on casing 10 to an opposite point on pump tubing 15 between which there exists no voltage differential. By means of casing insulation 25 and electrical connection 24 the lower length L of casing 10 may be made the radiating section and pump tubing 15 may be extended downward to the level of the lower end of casing 10 without interfering with the radiating properties of the radiating section. In this modification, the lower length L of casing 10 is again equipped with a series of perforations 23 to permit the flow of crude petroleum from oil-bearing strata 11a into pocket 13. As before, electromagnetic energy is radiated into the oil-bearing strata 11a thereby generating heat at those points in the formation where the energy absorption occurs.

Other modifications may be apparent in the positioning of the radiated section at the bottom of the well, but in any case the length L is electrically equivalent to about one-quarter of the wavelength corresponding to the frequency of the energy radiated or is any integral multiple of a quarter-wavelength. For example, heating a deep or thick oil-bearing strata would require a longer radiating section and a radiating section L with a length about equivalent to two or three quarter-wavelengths may be employed. An efficient radiating section may be any number of quarter-wavelengths long.

Figure 4 shows a schematic wiring diagram of an oscillator which is suitable for use in generator 30. This is known to those skilled in the art as a tuned-plate, tuned-grid type, and is included here as typical of that type of electrical equipment suitable for the generation of electromagnetic energy at radio frequencies. The self-excited oscillator shown in Figure 4 contains vacuum tube 45 containing anode 49, control grid 50, and filament 51. The circuit contains a grid tank circuit comprising inductance coil 41 and grid tank condenser 42 connected to control grid 50 of the vacuum tube and a plate tank circuit which consists of inductance coil 38 and plate tank condenser 39 connected to anode or plate 49 in vacuum tube 45. Bias voltage for the grid circuit is provided by current flow through resistance 43, the capacitance 44 provides a low impedance path for radio-frequency current flow in the grid circuit. Filament 51 of vacuum tube 45 is provided with by-pass condenser 48 and 48a. A filament voltage ranging from about 2.5 to 25 volts or higher is applied by means of contacts 47 and 47a to energize filament 51 which provides a source of electrons in vacuum tube 45. The D. C. voltage required by the oscillator for operation is applied by means of contacts 46 and 46a which are connected to a suitable D. C. power supply. This voltage may be varied as previously described in order to adjust the amount of energy generated by the oscillator. The interelectrode capacitance between anode 49 and control grid 50 serves as a low impedance path for the return of radio-frequency energy from the plate circuit to the grid circuit and in this way the oscillator is excited. Energy thus by-passed into the grid circuit is amplified by the action of vacuum tube 45 and thus returned to the plate circuit. The frequency of oscillation is primarily determined by the characteristics of the plate circuit, i. e., the capacity of tank condenser 39 and the inductance of inductance coil 38, and for stable operation of such an oscillator the grid circuit consisting of inductance coil 41 and capacitance 42 is so designed to resonate at a frequency slightly lower than that of the plate circuit.

Electromagnetic energy is withdrawn from the plate circuit consisting of inductance coil 38 and plate tank condenser 39 by means of coupling coil 40 which is positioned in the direct electromagnetic field of inductance coil 38. The energy thus removed by means of coupling coil 40 is transferred to terminals 32 and 33 which correspond to terminals 32 and 33 in Figure 1. Other types of radio-frequency generator equipment may be utilized depending upon the frequency or the amount of electromagnetic energy desired. The principal modification of the source of radio-frequency electromagnetic energy consists of a radio-frequency oscillator which generates electromagnetic energy the frequency of which may be varied, followed by a number of power amplifiers serving to increase the amount of available electromagnetic energy to any desired value, although there are others.

Referring now more particularly to Figure 5, a well bore is shown penetrating the permeable productive strata 110 which may contain desirable fluids such as crude petroleum. This well bore is provided with casing 111 extending from the earth's surface 112 to a point just above productive strata 110 and is set in cement seal 113. Within casing 111 is extended tubing 114 through casing head 115 down to a level somewhat below the lower extremity of casing 111. Tubing 114 is provided at its upper extremity with pressure gauge 116 and production line 117 controlled by valve 118. The lower portion of tubing 114 is provided with insulating coupling 119 from which is suspended tubing 120. Tubing 120 extends downward to near the lower end of the borehole and into the body of crude petroleum which enters the bore from strata 110. Around tubing 120 is wound radiator 121 which in this modification is a helical coil using tubing 120 as a coil form. It is preferable that tubing 120 be approximately the same diameter as tubing 114 through which the crude petroleum is produced and that it be fabricated of an insulating material such as plastic, ceramic, or ceramic reinforced plastic material having desirable dielectric properties and physical properties capable of withstanding the pressures and temperatures encountered within the well bore. Polyethylene and other types of plastic or resinous materials which may or may not be reinforced with ceramic type materials in the form of fibers, small particles, granules, and the like, or with glass wool or laminated with glass cloth are particularly suitable to this service. Transite or other concrete-base tubing may be employed if properly treated by varnishing or resin impregnation to prevent water absorption.

Radiator 121 is connected by connection 122 to transmission line 123 which in Figure 5 is illustrated as a coaxial line. In this modification the inner conductor is connected to radiator 121 while the outer conductor is grounded by means of connection 124 to casing 111. It may also be grounded by means of connection 125 to the lower extremity of tubing 114 just above insulated coupling 119. Transmission line 123 extends through the annular space between tubing 114 and casing 111 through casing head 115 at the surface and is provided with connections 126 and 127 by means of which electromagnetic energy generated at the surface is conducted into transmission line 123 for transmission to radiator 121.

The electromagnetic energy generator employed in this service may be a radio-frequency oscillator of the self-excited variable frequency type and directly connected to the connections 126 or 127, or the oscillator may be followed by a multiplicity of power amplifiers by means of which the power developed may be raised to any desired magnitude. It is sometimes desirable to substitute a crystal oscillator followed by a series of power amplifiers for the system described above. In this service it is generally desirable to employ an oscillator followed by a required number of power amplifiers since the efficiency of radio-frequency amplifiers is considerably higher than the efficiency of radio-frequency oscillators.

The modification of apparatus shown in Figure 5 is particularly well adapted to either pumping of flowing wells, and Figure 5 shows the apparatus applied to a flowing well. In a pumping well, special nonconducting materials should be employed in fabricating the sucker rod and pump if these components extend into the coil. Conventional rods and pumps may be used if set above insulating coupling 119.

Referring now more particularly to Figure 6, another modification of the radiation apparatus of this invention is shown applied to a pumping well which is provided with a cased sump beneath the producing formation from which collected crude petroleum is removed. In Figure 6 as in Figure 5, the well is provided with casing 111, tubing 114, casing head 115, production line 117, valve 118, and insulated coupling 119. This last named coupling permits a mechanical connection between tubing 114 which is generally a steel tube, and radiator 130 which is preferably a copper or copper alloy tube, or a copper plated steel tube which forms a more efficient radiator than materials of steel. Within radiator 130 is positioned check valve 131 and pump 132 which is directly attached to sucker rod 133. Sucker rod 133 extends to the surface where it is attached to reciprocating motive means not shown, adapted to actuate pump 132 and remove crude petroleum or other fluid from the well. A cased sump 134 is provided with casing 135 which is cemented at its upper and lower extremities by cement seals 136 and 137. Crude petroleum from producing formation 110 flows into the well bore and collects in sump 134 from which it is removed through tubing 130 and 114 by means of pump 132.

Electromagnetic energy, generated by a suitable generator, such as that described in conjunction with Figure 4, is conducted through contacts 126 and 127 through transmission line 123 to a point approximately adjacent to insulated coupling 119. At this point the center conductor is connected by means of connection 138 to the upper end of radiator 130 while the outer conductor is grounded by means of connection 139 to a point near the lower extremity of casing 111. In this modification, the formation interval to be heated is uncased and by selecting the frequency of electromagnetic energy after consideration of the length of the formation interval to be heated resonance may be obtained so that the upper one-third or one-half of radiator 130 is opposite formation 110 to be heated. With one-quarter wavelength resonance, the upper one-third to one-half of radiator 130 is the length from which the most intense radiation occurs. Whereas, with three-quarter wavelength or one wavelength resonance the radiation or heat intensity is more uniform over the length of the radiator. With one-half wavelength resonance the radiation is most intense near the center two-thirds of the radiator's length.

Referring now more particularly to Figure 7, another modification of the improved radiation apparatus of this invention is shown in which a portion of the well casing is employed as the radiator. As before, this well is provided with casing 111, tubing 114, casing head 115, production line 117 controlled by valve 118, transmission line 123, and contacts 126 and 127. In case the well penetrating productive formation 110 is a pressure or flowing well, tubing 114 may be provided at the bottom thereof with choke 140 by means of which the production rate is determined.

Casing 111 extends downward to a point somewhat above the upper level of productive formation 110 and is set by means of cement seal 141. A perforated or slotted liner 142 extends downward through the producing formation 110 to aid in supporting the walls of the borehole and is provided at the bottom thereof with cement seal 143. Casing 111 and liner 142 are insulated from one another by means of an insulated coupling 144. In this modification liner 142 functions as a radiator and is in effect a part of the casing, a part which is electrically insulated from the main casing which extends from the surface to the producing formation.

Electromagnetic energy is transmitted from the surface from a suitable electromagnetic energy generator by means of transmission line 123 to the location in the subsurface it is desired to heat. At this point the center conductor is connected by means of connection 145 to liner 142 while the outer conductor is grounded by means of connection 146 to the lower extremity of casing 111. In this manner liner 142 is excited by the transmitted high frequency energy and energy radiation into producing formation 110 results. To effect the highest degree of radiation efficiency, it is preferable that liner 142 be fabricated from a relatively highly conductive metal such as an aluminum or copper alloy, copper plated steel, aluminum clad steel, or the like.

Referring now more particularly to Figure 8, another modification of improved radiation apparatus of this invention is shown in which the lower extremity of the well casing is employed as a radiator, but wherein the radiating portion is not insulated from the rest of the well casing. In Figure 8 casing 111, tubing 114, casing head 115, production line 117, valve 118, transmission line 123, and contacts 126 and 127 are shown as before. Casing 111 lines the walls of the borehole from the surface completely through formation 110 to the non-productive formations below where casing 111 is set in cement seal 147. The lower portion of casing 111 opposite the producing formation is perforated such as by shot perforation or other means to permit the entry of crude petroleum or other fluids from producing formation 111. Transmission line 123, which is shown here as a coaxial cable but which may be other forms of low-loss radio-frequency energy transmission line, extends through casing head 115 through the annular space between casing 111 and tube 114 to a depth approximately equal to the depth of the upper extremity of producing formation 110. The conductors of transmission line 123 are connected by means of connection 148 to the inside of casing 111 at point 150 somewhat below point 151 at which the outer or other conductor of transmission line 123 is connected by means of connection 149 to a point on casing 111. The points of contacts of connections 148 and 149 are respective points 150 and 151 and are spaced on casing 111 a distance L. This type of connection between a transmission line and a radiating member is known as a "delta" connection. By changing distance L, the impedance of the matching transformer thus formed may be altered to permit an accurate matching of radiation and transmission line impedances.

The delta connection may be employed to couple a transmission line to a radiating member comprising an extension of the tubing instead of the casing shown in Figure 8. Such a modification is like that shown in Figure 6 but preferably without the insulation shown there between the radiator and the rest of the tubing.

The lower portion of casing 115, that portion which penetrates producing formation 110, is preferably provided with perforations 152 which permit entry of crude petroleum or other fluid from producing formation 110 into the annular space within casing 111. From this position it may be produced by pressure, by gas lift, by pumping or other methods familiar to those skilled in the art.

It is to be understood that transmission lines other than coaxial cable 123 shown in the drawings may be employed without departing from the scope of this invention. The other known types may be employed if desirable such as twisted pairs of conductors, open parallel wire lines, wave guides, and the like, or combinations of these. Coaxial line with polyethylene resin dielectric is very well suited to this purpose. It is desirable, however, to use coaxial line with air or gas dielectric in the region being heated due to the effect of heat on the resin dielectric. To resist corrosion the exposed surface of the radiators may be plastic coated or otherwise chemically insulated. They may also be electrically insulated with a thin relatively nonabsorbing layer of such materials to permit operation in contact with subsurface lines without deleterious effects.

The operation and effects noted by employing the heating method and the improved radiators of this invention may be readily seen from the following examples:

EXAMPLE I

A radiator similar to the modification shown in Figure 5 was built using a 35 foot coil of 0.25 inch copper tubing with about 11 turns per foot on an insulating cylinder 2.375 inches in diameter. In the hole surrounded by oil sand but without having oil in direct contact, the three-quarter wavelength resonant frequency was 4.0 megacycles. By allowing crude oil to fill the hole and directly contact the radiator, the three-quarter wavelength frequency was reduced to 2.5 megacycles.

EXAMPLE II

A radiator similar to that shown in Figure 6 was employed in oil-bearing formation heating experiments. The radiator was a 2-inch pump tubing 40 feet in length positioned adjacent to the oil-bearing formation. Three temperature sensitive elements were positioned in contact with the formation to be heated at a distance of 18 inches from the radiator and at distances of 7, 21, and 33 feet from the point of connection between radiator and transmission line. The resonant frequency of this configuration was 3.94 megacycles and power was applied at a rate of 5.0 kw. for a period of 44 hours while the following temperature data were taken.

*Temperature rise in formation*

| Total Heating Time, Hours | Distance From Feed Point | | |
|---|---|---|---|
| | 7' | 21' | 33' |
| | °F. | °F. | °F. |
| 4.3 | 0.5 | 0.4 | 0.2 |
| 9.0 | 2.1 | 0.6 | 0.6 |
| 15 | 4.2 | 1.0 | 0.7 |
| 26 | 8.5 | 4.6 | 2.2 |
| 38 | 9.7 | 6.4 | 2.8 |
| 44 | 14.0 | 8.0 | 3.4 |

The oil-bearing formation was approximately 40% saturated with water and 60% with crude petroleum. The estimated half-energy absorption distance in this case was 1.7 feet.

The foregoing descriptions, in conjunction with the eight figures, include various improved radiating members or sections which may be positioned within the subsurface for the radiation of electromagnetic energy into producing or other formations wherein beneficial results are obtained by heating. In Figures 5 and 6, extensions of the pump tubing are employed as the radiating members; whereas, in Figures 7 and 8 extensions of the well casing are employed as the radiating members. The radiation from such members of the electromagnetic energy penetrates directly into the formation as electromagnetic energy wherein it is absorbed or dissipated and converted into thermal energy. The absorption of such radiated energy is such that the greatest quantity of thermal energy is generated in those sections of producing formations which are closed to the well bore and in which the application of heat for the reduction of viscosity has the greatest beneficial effect. The cross sectional area of a permeable formation which is open to fluid flow from such permeable formations into a well bore reaches a minimum at the exposed formation face in the well bore and consequently the greatest resistance to fluid flow exists there.

In the absorption of radiant energy of this type the degree of penetration may be governed by the frequency of the radiation; the lower frequencies tending to penetrate somewhat further than higher frequencies. The frequency also governs to some extent the length of exposed producing formation surface which may be heated since at the higher frequencies the quarter wavelength which is the fundamental radiating length of a radiating member is quite short and the average radiating member used at such frequencies may be several wavelengths long. In these instances, where long producing intervals are desired to be heated or where relatively high frequencies may be used, modification of improved apparatus according to this invention which are illustrated in and described in conjunction with Figures 6, 7, and 8 are preferably used. In instances where a relatively high degree of penetration of producing formation is desired, or where the producing interval to be heated is relatively thin, radiating members corresponding to members shown in and described in conjunction with Figure 5 are preferably employed.

The various modifications shown and described above permit radiation heating to be readily applied to substantially any producing formation in which various types of completion of the well bore have been made. The type of completion shown in Figure 5 where the walls of the borehole are supported by a casing down to the producing formation but the walls of the producing formation are unsupported is known as a "barefoot" completion and the types of heating shown in Figures 5 and 6 may be used in these cases. The type of completion shown in Figure 6 is somewhat similar to that shown in Figure 5, but in the case of Figure 6 a cased sump has been drilled into the nonproductive formations below to provide a reservoir for collecting oil or other fluids. The radiating members shown in Figure 5 or 6 may be applied with equal advantage to this type of completion. The types of completion shown in Figures 7 and 8 are somewhat different in that a casing or liner supports the walls of the borehole penetrating the producing formation and in these cases the radiating member preferably comprises a portion of the casing as shown.

The present invention has many pronounced advantages over the methods for heating oil-bearing strata previously mentioned. The radiating section and the transmission line connecting the radiating section with a radio-frequency electromagnetic energy generator consists of a convenient modification of the standard pump tubing and well casing employed in practically every oil well. The relative ease of installation in an oil well and complete absence of bulky equipment or delicate components from the apparatus of this invention constitutes a distinct advantage over those previously proposed. The energy penetrating the oil-bearing strata from the radiating section in the well bore passes a considerable distance. Thermal energy is generated in situ through the absorption and dissipation of this energy. This causes heating from within the oil-bearing strata in the complete absence of large temperature gradients preventing pyrolysis and water evaporation. The method of this invention involves the handling of no corrosive materials, and the efficiency of energy transferred from the surface of the earth into the oil-bearing strata is perhaps higher than any method previously used since a greater portion of the heat penetrates the formation before being carried back into the well by countercurrent flow of fluids. Because heat is generated at a distance from the well bore and actually within the oil-bearing strata, the distance to which the heat penetrates into the oil-bearing strata is in no way limited by the flow of crude petroleum in the reverse direction from the oil-bearing strata into the well. This constitutes another distinct advantage over virtually every other method proposed to accomplish the heating of oil-bearing strata because in previous methods heat was required to flow by conduction from the well bore into the oil-bearing strata, countercurrent to the natural crude petroleum flow. Further advantages in the method and apparatus of this invention exist in the fact that, within practical limits, limitation of the physical size of the radiating section exerts little or no restriction on the amount of electromagnetic energy radiated and thus does not restrict the amount of heat transferred to the oil-bearing strata.

It is to be realized that the foregoing description of the example of the process and apparatus of my invention is only illustrative thereof inasmuch as there are many modifications which may be employed without departing from the scope of the invention, the essence of which is the accomplishment of a unique method for heating by means of the absorption of radiated electromagnetic energy which may be conveniently applied to the heating of oil-bearing strata with an accompanying increase in crude petroleum production through the reduction in the crude petroleum viscosity. With this in mind it is apparent that wide diversity of procedural methods with regard to radiating section characteristics, methods of transmission of electromagnetic energy from the surface to the radiating section, methods of generation of the electromagnetic energy, and other factors may be employed which still will involve the elements of my invention. Further, I do not wish to be limited by the particular type of well or by the method by which these wells are completed inasmuch as the application of my invention is independent of the type of well and the manner by which it is completed.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for heating subsurface valuable fluid-bearing strata penetrated by a borehole provided with a casing and tubing through which the valuable fluid is produced which comprises establishing a radiator in said bore in proximity to said valuable fluid-bearing strata, positioning a transmission line in said borehole, generating radio-frequency electromagnetic energy, conducting said energy by means of said transmission line to said radiator, radiating electromagnetic energy therefrom at heat generating levels into said valuable fluid-bearing strata, heating said strata thereby to decrease the viscosity of the valuable fluid in said strata, and removing said valuable fluid from said borehole via said tubing at a rate beyond that when said heating is not employed.

2. A method for producing valuable fluids from permeable fluid-containing subsurface strata penetrated by a borehole which comprises supporting the walls of said borehole with a metal casing, positioning a tubing within said casing for transporting fluids from said strata to the earth's surface, establishing a radio frequency energy radiating antenna within said borehole adjacent to said strata, generating radio frequency electromagnetic energy at a rate of at least 5 kilowatts and at a frequency above 500 kilocycles, establishing a transmission line within said well bore between said casing and said tubing, conducting generated electromagnetic energy via said transmission line through said well bore to said antenna, and radiating electromagnetic energy therefrom into said strata for absorption therein at a rate sufficient to appreciably raise the temperature of said strata and decrease the viscosity of fluids contained therein.

3. A method for heating subsurface oil-bearing strata penetrated by a borehole provided with a casing and tubing through which oil is produced which comprises establishing a radiator in said bore in proximity to said oil bearing strata, positioning a transmission line in said borehole, generating radio-frequency electromagnetic energy, conducting said energy by means of said transmission line to said radiator, radiating electromagnetic energy therefrom at heat generating levels into said oil-bearing strata, heating said strata thereby to decrease the viscosity of the oil in said strata, and removing oil from said borehole via said tubing at a rate beyond that when said heating is not employed.

4. A method for heating subsurface oil-bearing strata penetrated by a borehole provided with a casing and tubing through which oil is produced which comprises establishing a stationary radiator in said bore in proximity to said oil-bearing strata, positioning a transmission line in said borehole, generating radio-frequency electromagnetic energy, conducting said energy by means of said transmission line separate from said casing and tubing to said radiator, radiating electromagnetic energy therefrom into said oil-bearing strata at a sufficient rate to decrease the viscosity of the oil in said strata by the heat liberated from radiated electromagnetic energy adsorption therein, and removing oil from said borehole via said tubing at an increased rate.

5. A method according to claim 4 wherein said radiator comprises a portion of said casing.

6. A method according to claim 4 wherein said radiator comprises a portion of said tubing.

7. A method according to claim 4 wherein said radio-frequency electromagnetic energy is generated at a rate of from about 5 to about 100 kilowatts at a frequency between 500 and 250,000 kilocycles.

8. In the method of recovering petroleum from a well penetrating an underground oil-bearing formation, the step comprising generating short electromagnetic waves and passing said waves having sharp bands or frequencies within the range 1 to 1000 megacycles from a radiator within the well into the surrounding oil-bearing formation, whereby the absorption of said high-frequency electromagnetic waves by said oil-bearing formation creates heat within said formation, thereby increasing the rate of flow of liquid petroleum through said formation, collecting petroleum in the well and thereafter pumping it to the surface of the ground.

9. In the method of recovering petroleum from a well penetrating an underground oil-bearing formation, the steps comprising generating short electromagnetic waves and passing said waves having sharp bands or frequencies within the range of 30 to 300 megacycles from a radiator within the well into the surrounding oil-bearing formation, whereby the absorption of said high-frequency electromagnetic waves by said oil-bearing formation creates heat within said formation, thereby increasing the rate of flow of liquid petroleum through said formation, collecting petroleum in the well and thereafter pumping it to the surface of the ground.

10. In the method of recovering petroleum from a well penetrating an underground oil-bearing formation, the steps comprising generating short electromagnetic waves and passing said waves having sharp bands or frequencies within the range of 1 to 30 megacycles from a radiator within the well into the surrounding oil-bearing formation, whereby the absorption of said high-frequency electromagnetic waves by said oil-bearing formation creates heat within said formation, thereby increasing the rate of flow of liquid petroleum through said formation, collecting petroleum in the well and thereafter pumping it to the surface of the ground.

11. An apparatus for heating subsurface strata which comprises in combination with a borehole penetrating said strata, a casing lining the walls of said borehole, a tubing disposed within said casing, a radio-frequency energy radiator having an electrical length substantially equal to an integral number of one-quarter wavelengths equivalent to said radio-frequency and disposed within the borehole adjacent the strata to be heated for radiating said electromagnetic energy thereinto at heat generating levels, a radio-frequency electromagnetic energy generator disposed at the open end of said borehole for generating energy at heat generating levels, and a radio-frequency energy transmission line connecting said generator to said radiator.

12. An apparatus for heating subsurface strata which comprises in combination with a borehole penetrating said strata, a metal casing, a metal tubing within said casing, a metallic radio frequency electromagnetic energy radiator having an electrical length substantially equal to an integral number of one-quarter wavelengths equivalent to the frequency of radio frequency energy radiated therefrom within the bore of said borehole, a radio-frequency electromagnetic energy generator, and means for conducting said energy from said generator to said radiator, wherein said metallic radiator comprises a portion of said metallic tubing within said casing.

13. An apparatus for the recovery of fluids from subsurface fluid-containing strata via a well bore penetrating said strata which comprises a metal casing supporting the walls of said borehole, a metal tubing within said casing for removing said fluids from said borehole, a stationary radio frequency antenna of length equivalent to an integral number of one-quarter wavelengths corresponding to the frequency of the radiated electromagnetic energy positioned within said borehole and adjacent the fluid-containing strata, means for generating electromagnetic energy at a rate at least sufficient to materially heat said strata, a coaxial radio frequency energy transmission line having two conductors disposed between said casing and said tubing connecting said generating means with said antenna, and means for removing fluids from said strata through said tubing.

14. An apparatus according to claim 13 wherein said tubing is provided with a pump to raise fluids through said tubing from said strata to the earth's surface.

15. An apparatus for heating the fluids contained in a subsurface strata by adsorbing therein radiated radio-frequency electromagnetic energy having a frequency greater than about 500 kilocycles which comprises in combination with a bore hole penetrating said strata, a cylindrical metal tubing supported within said casing, a metallic radio-frequency energy radiator having an electrical length substantially equal to an integral number of one-quarter wavelengths corresponding to said frequency and disposed within said borehole adjacent said strata, a radio-frequency electromagnetic energy generator disposed at the surface of the earth, and radio-frequency energy transmission means disposed between said tubing and casing for electrically connecting said generator to said radiator.

16. An apparatus according to claim 15 wherein said metallic radiator comprises a portion of said metallic casing.

17. An apparatus according to claim 15 wherein said metallic radiator comprises a portion of said metallic tubing.

18. An apparatus for heating the oil contained in an oil-bearing strata by absorbing therein radiated electromagnetic energy having a frequency greater than about 500 kilocycles which comprises a well casing and concentric tubing string extending through a borehole penetrating said oil-bearing strata, generating means positioned substantially at the surface of the earth, radiating means having a length substantially equal to an integral number of one-quarter wavelengths equivalent to the frequency of said electromagnetic energy, said radiating means being positioned within said borehole adjacent to said oil-bearing strata, connecting means connecting said generating means with said radiating means to conduct said electromagnetic energy from said generating means to said radiating means, said connecting means consisting of a combination of conductors extending downward through and suitably insulated from said well casing and tubing to prevent shortcircuiting.

19. An apparatus according to claim 18 wherein said radiating means consists of a radiating section positioned in said borehole adjacent to said oil-bearing strata and insulated from the tubing string and said well casing.

20. An apparatus for recovering crude petroleum from subsurface oil-bearing strata via a borehole drilled into said strata which comprises a metal casing lining said borehole, a metal pump tubing concentric within said casing, pump tubing insulators insulating and spacing said pump tubing from said casing to form a coaxial transmission line through which said crude petroleum is conveyed, a radiating section adjacent to said oil-bearing strata formed by the extension of one part of said coaxial transmission line beyond the other part, and a radio-frequency energy generator connected to said coaxial transmission line.

21. An apparatus according to claim 20 wherein said radiating section comprises an extension of said metal tubing beyond the lower extremity of said metal casing.

22. An apparatus according to claim 20 wherein said radiating secttion comprises an extension of said metal casing beyond the lower extremity of said metal tubing.

23. An apparatus according to claim 20 wherein the length of said radiating section is equal to an integral number of one-quarter wavelengths equivalent to the frequency of said radio-frequency energy.

24. An apparatus according to claim 20 wherein the radio-frequency energy generated by said radio-frequency energy generator is at a frequency greater than about 500 kilocycles.

25. An apparatus for heating the oil contained in an oil bearing strata by absorbing therein radiated electromagnetic energy which comprises a well casing penetrating said strata, a tubing string within said casing and penetrating said strata, a generator positioned substantially at the surface of the earth to generate electromagnetic energy, a radiator adajecnt said strata, said radiator having a length substantially equal to an integral number of one-quarter wave lengths equivalent to the frequency of said electromagnetic energy, and a connector connecting said radiator with said generator to conduct said electromagnetic energy from the generator to the radiator.

26. An apparatus for heating the oil contained in an oil-bearing strata by absorbing radiated electromagnetic energy therein which comprises a well casing and a contric pump tubing extending through a borehole penetrating said oil-bearing strata, generating means positioned substantially at the surface of the earth for generating electromagnetic energy at a radio frequency, subsurface radiating means positioned within the well bore adjacent to said oil-bearing strata, connecting means connecting said generating means to said radiating means to conduct said electromagnetic energy from said generating means to said radiating means, said connecting means consisting of said pump tubing and well casing maintained in concentric relationship and insulated from each other throughout the length of their concentric relationship by pump tubing insulators insulating and spacing said pump tubing from said casing to form a coaxial transmission line.

27. An apparatus according to claim 26 wherein said radiating means comprises an extension of said pump tubing beyond the lower end of said well casing, a distance which is substantially equal to an integral number of one-quarter wavelengths equivalent to the frequency of said electromagnetic energy generated by said generating means.

28. An apparatus according to claim 26 wherein said radiating means comprises an extension of said well casing beyond the lower end of said pump tubing a distance which is substantially equal to an integral number of one-quarter wavelengths equivalent to the frequency of said electromagnetic energy generated by said generating means.

29. An apparatus according to claim 26 in which said pump tubing and said well casing are extended downwardly into said oil-bearing strata to an equal depth and wherein said radiating section comprises the lower portion of said well casing having a length which is substantially equal to an integral number of one-quarter wavelengths equivalent to the frequency of said electromagnetic energy generated by said generating means, said radiating section being insulated from the upper portion of said well casing and having at the upper end of said radiating section a direct electrical connection to an opposite point on said pump tubing.

30. An apparatus for heating subsurface oil-bearing strata to increase the production rate thereof which comprises in combination with a borehole penetrating said strata from the surface of the earth, a cylindrical metal well casing, a cylindrical metal tubing substantially coaxial within said casing and through which tubing oil is conducted to the surface, said tubing being provided at its lower end with a tubular extension of substantially the same diameter and fabricated of an insulating material, a metallic coil as a radiator supported on said extension and positioned in proximity to said strata, a radio-frequency electromagnetic energy generator, and a transmission line disposed between said metallic tubing and casing to conduct energy from said generator to said radiator.

31. An apparatus for heating subsurface oil-bearing strata to increase the production rate thereof which comprises in combination with a borehole penetrating said strata from the surface of the earth, a cylindrical metal well casing, a cylindrical metal tubing substantially coaxial within said casing and through which tubing oil is conducted to the surface, said tubing being provided at its lower extremity with a metallic tubular radiator having an electrical length substantially equal to an integral number of one-quarter wavelengths equivalent to the frequency of electromagnetic energy radiated therefrom, said radiator being disposed substantially coaxial therewith and positioned in proximity to said strata, a radio-frequency electromagnetic energy generator, and a transmission line disposed between said metallic casing and tubing connecting said generator with said radiator to conduct energy therebetween.

32. An apparatus according to claim 31 wherein said radiator is insulated from said tubing.

33. An apparatus for heating subsurface oil-bearing strata to increase the production rate thereof which comprises in combination with a borehole penetrating said strata from the surface of the earth, a cylindrical metal well casing, a cylindrical metal tubing substantially coaxial within said casing and through which tubing oil is conducted to the surface, said casing being provided at its lower extremity with a metallic tubular radio frequency electromagnetic energy radiator substantially coaxial therewith and positioned in proximity to said strata, said radiator having an electrical length substantially equal to an integral number of one-quarter wavelengths equivalent to the frequency of said electromagnetic energy radiated therefrom, a radio-frequency electromagnetic energy generator, and a transmission line disposed between said tubing and casing connecting said generator with said radiator to conduct energy therebetween.

34. An apparatus according to claim 33 wherein said radiator is insulated from said casing.

References Cited in the file of this patent
UNITED STATES PATENTS

| | | |
|---|---|---|
| Re. 23,381 | Bodine | June 26, 1951 |
| 972,308 | Williamson | Oct. 11, 1910 |
| 1,354,757 | Popcke et al. | Oct. 5, 1920 |
| 1,372,743 | Gardner | Mar. 29, 1921 |
| 1,747,983 | McCarthy | Feb. 18, 1930 |
| 1,934,955 | Thrupp | Nov. 14, 1933 |
| 2,018,080 | Martienssen | Oct. 22, 1935 |
| 2,083,799 | Roberts | June 15, 1937 |
| 2,167,630 | Bazzoni et al. | Aug. 1, 1939 |
| 2,220,070 | Aiken | Nov. 5, 1940 |
| 2,239,724 | Lindenblad | Apr. 29, 1941 |
| 2,244,256 | Looman | June 3, 1941 |
| 2,259,318 | Mouromtseff | Oct. 14, 1941 |
| 2,297,513 | Van Baeyer | Sept. 29, 1942 |
| 2,321,454 | Brown | June 8, 1943 |
| 2,389,241 | Silverman | Nov. 20, 1945 |
| 2,411,696 | Silverman et al. | Nov. 26, 1946 |
| 2,421,790 | Korman | June 10, 1947 |
| 2,437,456 | Bodine | Mar. 9, 1948 |
| 2,455,940 | Muskat et al. | Dec. 14, 1948 |
| 2,472,445 | Sprong | June 7, 1949 |

OTHER REFERENCES

Henney: Radio Engineering Handbook; third edition; 1941 McGraw-Hill Book Co. (page 514).

Taylor: A Radio Frequency Gun, Electronics, November 1943, pages 106–111, 310.